US008687485B1

(12) United States Patent
Dondeti et al.

(10) Patent No.: US 8,687,485 B1
(45) Date of Patent: Apr. 1, 2014

(54) METHOD AND APPARATUS FOR PROVIDING REPLAY PROTECTION IN SYSTEMS USING GROUP SECURITY ASSOCIATIONS

(75) Inventors: Lakshminath Dondeti, Chelmsford, MA (US); Donald Fedyk, Groton, MA (US); Haixiang He, Woburn, MA (US)

(73) Assignee: Rockstar Consortium USLP, Plano, TX (US)

( * ) Notice: Subject to any disclaimer, the term of this patent is extended or adjusted under 35 U.S.C. 154(b) by 2170 days.

(21) Appl. No.: 10/864,146

(22) Filed: Jun. 9, 2004

Related U.S. Application Data (60) Provisional application No. 60/502,537, filed on Sep. 12, 2003.

(51) Int. Cl.
*H04L 12/26* (2006.01)
(52) U.S. Cl.
USPC .......................... 370/230; 370/389; 370/474
(58) Field of Classification Search
USPC ................. 370/394, 230, 289, 474; 726/3, 14
See application file for complete search history.

(56) References Cited

U.S. PATENT DOCUMENTS

| 6,701,437 | B1 * | 3/2004 | Hoke et al. ...................... 726/15 |
| 6,907,532 | B2 * | 6/2005 | Jari et al. ......................... 726/15 |
| 6,978,384 | B1 * | 12/2005 | Milliken .......................... 726/26 |
| 7,058,973 | B1 * | 6/2006 | Sultan ............................. 726/12 |
| 7,072,346 | B2 * | 7/2006 | Hama ...................... 370/395.53 |
| 7,120,930 | B2 * | 10/2006 | Maufer et al. .................. 726/11 |
| 7,181,012 | B2 * | 2/2007 | Arkko et al. .................. 380/270 |
| 7,231,664 | B2 * | 6/2007 | Markham et al. ............... 726/15 |
| 7,234,063 | B1 * | 6/2007 | Baugher et al. ............... 713/189 |
| 7,237,262 | B2 * | 6/2007 | Lahti et al. ...................... 726/13 |
| 2002/0133594 | A1 * | 9/2002 | Syvanne ....................... 709/226 |
| 2003/0061507 | A1 * | 3/2003 | Xiong et al. .................. 713/201 |
| 2003/0196081 | A1 * | 10/2003 | Savarda et al. ............... 713/153 |
| 2004/0006708 | A1 * | 1/2004 | Mukherjee et al. ........... 713/201 |
| 2004/0101138 | A1 * | 5/2004 | Revital et al. ................. 380/210 |
| 2004/0128553 | A1 * | 7/2004 | Buer et al. ..................... 713/201 |
| 2004/0205332 | A1 * | 10/2004 | Bouchard et al. ............. 713/153 |

OTHER PUBLICATIONS

Hardjono et al., The Multicast Security Architecture, Internet-draft, May 2003, 19 pages.
Mark Baugher et al., Group Key Management Architecture, Internet-draft, Jun. 27, 2003, 34 pages.
E.Rosen et al., BGP/MPLS VPNs, The Internet Society, Mar. 1999, 24 pages.

* cited by examiner

*Primary Examiner* — Jason Mattis
(74) *Attorney, Agent, or Firm* — Anderson Gorecki & Rouille LLP (57) ABSTRACT

A method and apparatus is disclosed which enables detection of undesired packets received at a device in a network, where the device is a member of a group of devices in the network. A registration table stores transform identifiers for each member of a group and controls the forwarding of the transform identifiers to the members of the group as members are added and deleted. A transform identifier indicates a format or transformation of a packet transmitted by an associated member. The transform identifier can therefore be used at a receiving device to distinguish between transmissions by different members of the group, thereby enabling the receiving device to extract sequence information associated with the member from the packet. The sequence information can be compared against an expected sequence number for the member to determine whether the packet is an undesirable or rogue packet.

22 Claims, 4 Drawing Sheets

METHOD AND APPARATUS FOR PROVIDING REPLAY PROTECTION IN SYSTEMS USING GROUP SECURITY ASSOCIATIONS

RELATED APPLICATIONS

This application claims priority to provisionally filed U.S. application Ser. No. 60/502,537 filed Sep. 12, 2003.

FIELD OF THE INVENTION

This invention relates generally to the field of secure communications and more particularly to a method and apparatus for detecting undesired packets in a networked environment.

BACKGROUND OF THE INVENTION

As it is known in the art, Internet Protocol Security (IPsec) is a security protocol that provides security services at the IP layer by enabling a system to select required security protocols, determine the algorithm(s) to use for services, and put in place any cryptographic keys required to provide the requested services. IPsec can be used to protect one or more paths between a pair of hosts, between a pair of secure gateways, or between a secure gateway and a host. The set of security services that IPsec can provide includes access control, connectionless integrity, data origin authentication, limited traffic flow confidentiality, and anti-replay checks.

In IPsec, two protocols are used to provide traffic security. These protocols utilize the Authentication Header (AH) and Encapsulating Security Payload (ESP). The IP Authentication Header is used to provide connectionless integrity and data origin authentication for IP datagrams, and to provide protection against replays. The ESP protocol may provide confidentiality (encryption) and limited traffic flow confidentiality. It also may provide connectionless integrity, data origin authentication, and an anti-replay service. The AH and ESP protocols may be applied alone or in combination with each other to provide a desired set of security services in IPv4 and IPv6.

IPsec offers, via AH or ESP protocol, a form of partial sequence integrity referred to as anti-replay integrity, which detects the arrival of duplicate IP datagrams (or packets) within a constrained window to help counter denial of service (DoS) attacks. A DoS attack is a type of attack on a network that is designed to bring the network to its knees by flooding it with useless traffic. Many DoS attacks, such as the Ping of Death and Teardrop attacks, exploit limitations in the TCP/IP protocols. The anti-replay mechanism seeks to overcome DoS attacks by assigning the sequence number of received packets, and dropping any packets having duplicate sequence numbers within a predefined window.

While the IPSec anti-replay mechanism is effective in many peer to peer environments, there are network architectures that generally cannot benefit from its application. One example of such a system is Provider Provisioned Virtual Private Networks (PPVPNs) such as those described in RFC 2547, incorporated herein by reference. Another such network is described in METHOD AN APPARATUS FOR PROVIDING A SCALABLE AND SECURE NETWORK WITHOUT POINT TO POINT ASSOCIATION, Ser. No. 10/661,959, filed on Sep. 12, 2003 by Fedyk et al, (hereinafter referred to as the Group Security Association (GSA) architecture).

Both the PPVPNs and the GSA architecture use group keys to efficiently secure data communications between edge devices. The GSA architecture incorporates the concepts of group key management protocol with a modification of security boundary positioning to provide a network that is both readily scalable and secure. Trusted ingress points and a trusted egress points in the network are identified. The trusted ingress point may be, for example, a gateway station, which attaches a source station (which is part of a local area network) to the internet, and it is assumed that the gateway station provides firewall protection to any communication behind the gateway. Similarly, the trusted egress station is any station that is coupled to a destination station, and wherein communication between the trusted egress station and destination station is protected. IPSec processing would also be performed at the egress station.

According to GSA architecture each station that is to be part of a private network registers with a key table. A group security association associated with the private network is forwarded to each trusted ingress and egress point that communicates with each member of the private network. When a member of the private network seeks to communicate with another member, it simply forwards the communication to the trusted ingress point with a Virtual Private Network (VPN) group address associated with the other member. The trusted ingress point uses the group security association associated with the private network to transform the communication and forwards the transformed communication through other intermediate stations in the network, until it reaches the trusted egress point. The trusted egress point uses the stored group security association corresponding to the Virtual Private Network (VPN) group address to decode the transformed communication and forwards the communication to the appropriate destination.

Thus, the GSA architecture provides a scalable means for securing communication between two end-points. However, the GSA architecture cannot easily support the use of sequence number for anti-replay handling, because multiple users share the same Security Association (SA), and the multiple users cannot easily synchronize the sequence number of the SA. It would be desirable to identify an anti-replay mechanism for use in the GSA architecture.

SUMMARY OF THE INVENTION

According to one aspect of the invention, a method is provided for detecting undesired packets received at an edge device in a network, where the edge device is a member of a group of devices in the network. The method includes the steps of receiving a transform identifier for each member of the group and decoding a packet received from one of the members of the group using the transform identifier associated with the one of the members, including extracting a sequence number from the packet. The method further includes the step of comparing the sequence number against an expected sequence number for the one of the members, and discarding the packet if the sequence number indicates that the packet is an undesired packet. With such an arrangement, a method is provided that permits anti-replay mechanisms to be used in a group keyed network by enabling receiving members of the group to distinguish between sending members of the group. Because the receiving group member can distinguish between sending group members, it can correlate received sequence numbers with each expected sequence numbers for the different members of the group. In one embodiment, the transform identifier is a security association used to transform communications transmitted by an associated group member. In another embodiment, a common group security association is used for communicating between all group members, and the transform identifier for each member is the Security Parameter Index (SPI) of the associated member.

According to another aspect of the invention, a network device includes a table for storing a plurality of transform identifiers, each one of the plurality of transform identifiers associated with a different one of a plurality of members of a group of which the network device is also a member. The network device also includes a table for storing a sequence number for each one of the plurality of members of the group. In another embodiment, the network device further comprises a means for transforming a communication received from one of the members of the group using the corresponding transform identifier to determine whether a sequence number extracted from the communication is an expected sequence number for the member, and means for discarding packets received with unexpected sequence numbers.

According to another aspect of the invention, a network device includes means for storing, for each group in which the device is a member, a transform identifier for each member of each group and an expected sequence number for each member of each group; and means for determining whether a packet received at the network device is an undesired packet by comparing an extracted serial number, extracted from a communication by a given member of a group using the transform identifier associated with the given member, against an expected serial number stored for the given member, to determine whether the extracted sequence number correlates to the expected sequence number.

According to another aspect of the invention, a network includes a registration table for storing registration information associated with a plurality of members of a group, wherein the registration information includes a transform identifier for each member of the group, the transform identifier for use by the corresponding member of the group for transforming communications issued by the corresponding member. The network further includes means for forwarding the transform identifiers for each member of a group to all members of the group.

According to a further aspect of the invention, a method for detecting replayed packets in a network including the steps of registering each member of a group of members at a device in the network, including associating, with each member of the group, a different transform identifier to be used by the member of the group when transmitting communications to other members of the group; and forwarding transform identifiers for each member of the group to all members of the group to enable each member of the group to distinguish between communications received at the each member for the purposes of detecting replayed packets. With such an arrangement, group members can correlate a received packet with a transmitting group member, and thereby associate certain information in the packet (such as the sequence number) with the sending member for the purposes of detecting undesired packets.

DETAILED DESCRIPTION

Exemplary methods and apparatus by which the present invention uses unidirectional Security Associations to enable anti-replay mechanisms to be used in networks that use Group Security Associations to secure data between endpoints will now be described with reference to the attached figures.

Figure 1:
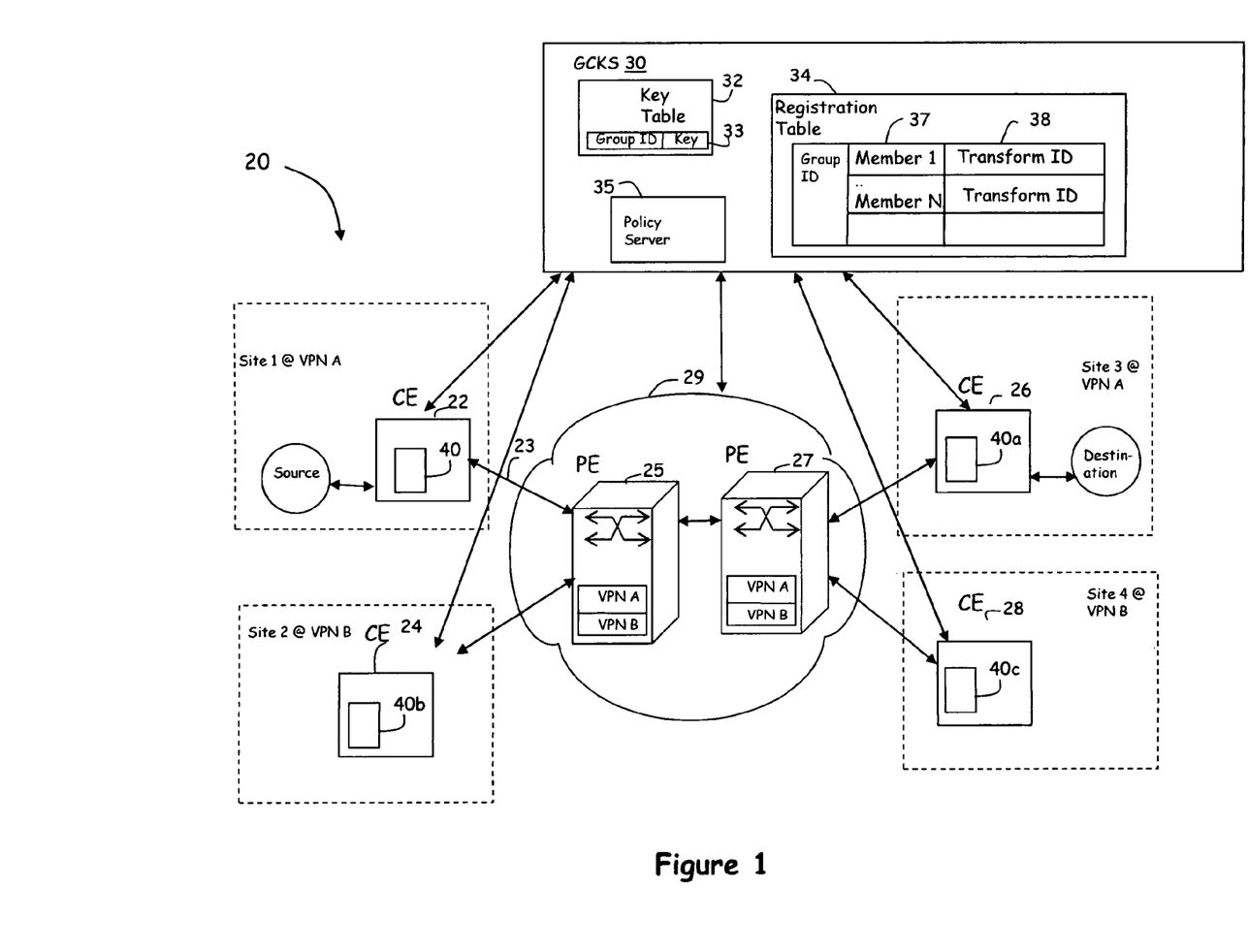
FIG. 1 is a diagram of an Internet Protocol Virtual Private Network (IP VPN) in which the present invention may be implemented.

Referring now to FIG. 1, an IP VPN network 20 is shown to include a number of Customer Edge (CE) devices 22, 24, 26 and 28, coupled to one or more Provider Edge (PE) routers 25 and 27. In the IP VPN network, routing information for each CE is maintained in Virtual Routing and Forwarding Tables 22 and 23. Each PE includes routing information for only the CEs which are members of VPNs that traverse the PE. By limiting the routing information to those VPNs that traverse the PE, it can be assured that the CE devices that are not members of the respective VPN cannot gain access to the network.

Group key management protocols help to ensure that only members of a secure group can gain access to and authenticate group data. The main goal of group key management protocol is to securely provide the group members with an up to date Security Association (SA) containing the information need to secure group communication. Generally speaking, a Security Association (SA) is a set of policy and cryptographic keys that provide security services to network traffic that matches that policy. A SA typically includes selectors, properties, cryptographic policy, and keys. The selectors include source and destination transport addresses. The properties include, for example, a security parameter index or cookie pair, and identities. Cryptographic policy includes the algorithms, modes, key lifetimes, and key lengths used for authentication or confidentiality. The keys include the authentication, encryption and signing keys. It should be noted that the present invention may utilize any type of SA, and thus should not be limited to only the SAs used below to describe the exemplary embodiments.

Group Security Associations (GSAs) are a bundling of SAs that together define how a group communicates securely. The GSA may include, for example, a registration SA, a rekey protocol SA, and one more data security protocol SAs. A GSA includes all of the attributes identified above with regard to SAs, but also include several additional attributes. For example, GSAs have group policy attributes, such as the kind of signed credential needed for group membership, if group members will be given new keys when a member is added, or whether group members will be given new keys when a member is removed from the group. A GSA is comprised of multiple SAs, and these SAs may be used for independent purposes. For example, three types of SAs which are generally needed for group communication are Registrations SAs, allowing a group member to register with the GCKS, Re-Key SAs, allowing the GCKS to forward new keys to all group members, and Data Security SAs, which protect data between sending and receiving members of the group.

One element of group key management which is used in the present invention is the Group Controller and Key Server (GCKS) 30. GCKS 30 is shown in FIG. 1 coupled to each of the CE devices, and is used to transfer a key to each CE that is a member of each VPN, wherein a unique key is provided for each VPN. Although the GCKS 30 is shown as one functional block, it is used to represent both the entity and functionality relating to the issuance and management of cryptographic keys used by a multicast group, which is subject to the user authentication and authorization checks conducted on the candidate member of the multicast group. Although only one GCKS is shown in FIG. 1, it should be understood that there may be one or more GCKSs in a network, and thus the key management functionality may be distributed.

The GCKS 30 is shown to include various representative components, including a key table 32, a registration table 34 and a policy server 35. It should be noted that although the components are shown as separate entities, the below described functionality of each may be merged or further divided, and the functionality may be implemented in software, hardware, or some combination thereof. The key table 32 includes a number of entries, such as entry 33, which stores a key for each group ID. The key is used by the group for encryption and decryption of packets that are transferred between group members, and thus provides at least one SA for the group.

The registration table 34 is used to identify members of each group (or VPN in this example). As CEs enter and leave the VPN, the registration table is updated to reflect the current VPN members. In the event of a key change or the like, the registration table provides member identification data for transmitting the change to each member of the respective group.

According to one aspect of the present invention, the registration table also stores a transform identifier 38 for each member 37 of a group. The transform identifier is associated with each CE, and is used to relate a packet, received at a CE with the sending CE. In several embodiments, the transform identifier is related to security aspects associated with the packet. For example, in one embodiment of the invention, the transform identifier is a unique Security Association (SA) for the given CE. In another embodiment of the invention, the transform identifier is a Security Parameter Index (SPI) associated with the CE. In either embodiment, when the CE registers with the GCKS 30, after it is authenticated, the transform identifier is forwarded to the CE and also pushed to all other member CEs associated with the VPN. Thus, each CE in the group includes certain logic enabling operation of the present invention.

Figure 2:
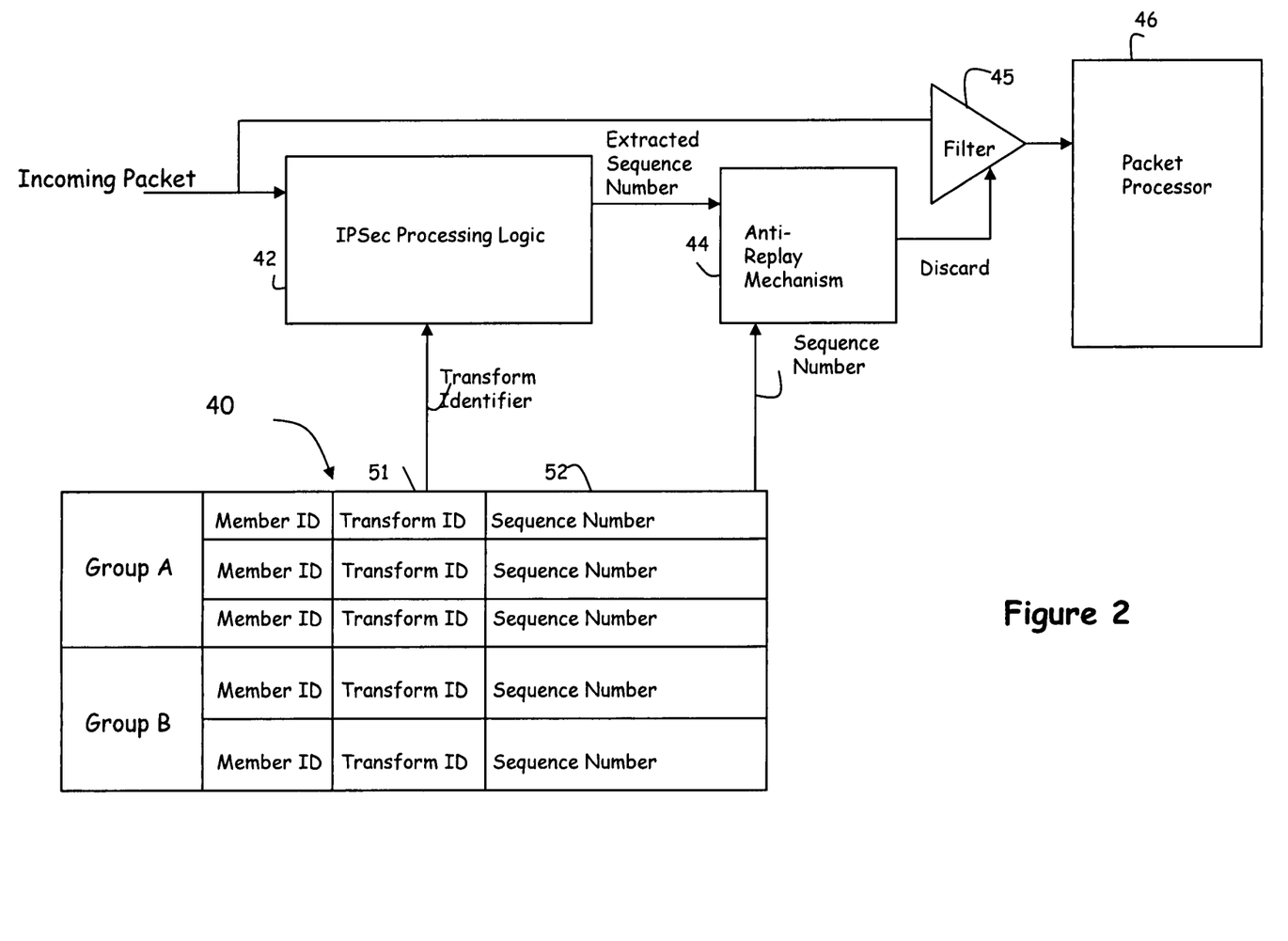
FIG. 2 is a diagram illustrating several exemplary components that may be included in a device implementing the present invention.

For example, referring now to FIG. 2, certain elements that may be included in a CE for the purposes of supporting the present invention are shown. The CE may include a table 40 which stores, for each group that the CE device is a member, certain information about other members of the group. For example, the table 40 stores for each member identifier associated with a group, a transform identifier 51 and a sequence number 52. In addition, the CE may include IPSec processing logic 42 (for decoding packets transferred using any of the known IPSec protocols), coupled to anti-replay mechanism 44. IPSec processing logic 42 uses the transform identifier to control IPSec processing. For example, in embodiments where the transform identifier is a key type Security Association, the IPSec processing uses the security association for purposes of decrypting the packet. For embodiments where the transform identifier is a SPI, the IPSec processing logic uses the SPI for the purposes of determining which protocol should be applied to the received packet. After applying the transform identifier, the IPSec processing logic forwards an extracted sequence number to anti-replay mechanism 44. As is known in the art, the sequence number is a field that is stored in an either the Encapsulation (ESP) Header or the Authentication Header (AH), as defined by existing IPSec protocols. Other protocols that include a sequence number in their header may be substituted herein, and the present invention is not limited to any particular security protocol.

The anti-replay mechanism 44 compares the extracted sequence number against an expected sequence number 52 for the sender. In general, anti-replay mechanisms work by discarding packets having matching sequence numbers within a predetermined time window. In one embodiment, no prior contact is assumed with a member so the first sequence number received is always accepted and used to set an expected sequence number. In one embodiment, all sequence numbers are set to zero or another well known number after each received packet stream at the receiver. In an alternative embodiment, when there are multiple receivers in a group, a sender may associate different sequence number streams for each of the different users. Thus each gateway device maintains O(n) SEQ numbers for sending, and O(n) SEQ numbers for receiving.

At the receiver, there are many different manners for determining whether the retrieved sequence number indicates a potential rogue packet, and the present invention is not limited to any particular sequence number determination process. Rather, any method of determining whether the extracted sequence number correlates to the expected sequence number may be substituted herein without affecting the spirit or scope of the invention.

If the anti-replay mechanism 44 determines that the sequence numbers do not correlate, a discard signal is forwarded to the filter 45. The filter effectively controls the forwarding of the received packet to the packet processor 46. Thus the anti-replay mechanism ensures that packets having undesirable sequence numbers will be dropped from further processing.

Although the above describes the 'transform' occurring at the CE device, it is to be understood that the present invention can be applied at any point in a network where IPSec processing is performed, provided that the resources can be provided at the destination for storing the transform identifiers for each expected source. Within the context of GSAs, an SPI can be associated with each sender of a group. Such an arrangement allows us to only increase the number of SPIs without actually having to generate and distribute different keys to the sending group members Furthermore, due to the scalable nature of PPVPNs, n SPIs may be used to connect a group of n senders, rather than n*n SPIs that would be required in prior art VPN networks.

Thus the present invention is not limited to being performed at any particular device or hierarchical level in the network.

Figure 3:
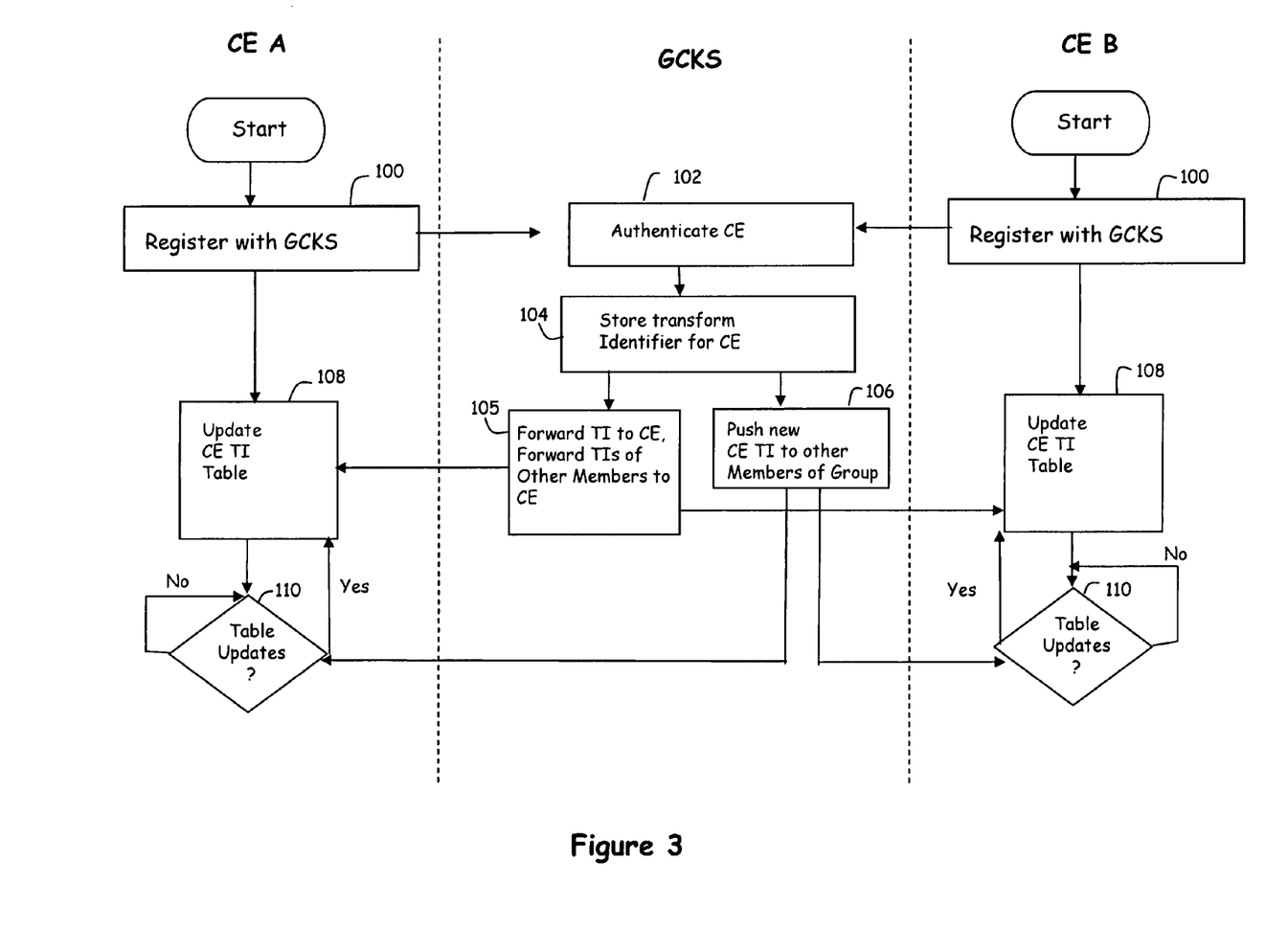
FIG. 3 is a functional flow diagram provided to illustrate a registration process performed by devices joining a group in the network of FIG. 1.

Referring now to FIG. 3, a functional flow diagram of an exemplary information flow process by which a CE registers with a GCKS and other member CEs are updated, is shown. At step 100, the CE forwards a registration request to the GCKS, and at step 102 the GCKS authenticates the CE using known methods such as those described in "The Multicast Security Architecture", Internet Engineering Task Force (IETF) Draft, draft-iety-msec-arch-01.txt, by Hardjono et al of May 2003, and "Group Key Management Architecture", IETF MSEC WG, Internet Draft draft-ietf-msec-gkmarch-05.txt, by Baugher et al, both incorporated herein by reference. Both of the above documents describe implementation alternatives that may be used for the registration and authentication steps of the GCKS, and the present invention is not limited to any particular manner of authentication and registration.

In one embodiment of the invention, at step 104 when the CE registers with the GCKS, the GCKS selects an SPI for the CE to avoid collisions, and forwards the SPI to the CE. In one embodiment, the CE may previously forward a bit field to the GCKS to be used as part of the SPI. The CE stores the SPI as the transform identifier for that member in the registration table 34. In such an embodiment, each member of the group uses a common Group Security Association (GSA) for securing inter-group communications, and receiving devices can distinguish between sending devices of the group by applying the protocol indicated by the SPI to the received communication.

In an alternative embodiment, when the CE registers with the GCKS, it forwards a desired security association (SA) with its registration request. The SA is stored as the transform identifier in the registration table 34 at step 104.

After the transform identifier has been stored for the CE, the GCKS forwards the transform identifier back to the CE to verify it's acceptance at step 105. In addition at step 105 the GCKS also forwards the identities and transform identifiers of all of the other members of the group to the CE. At step 106, the GCKS pushes the transform identifier of the new CE to other members that are registered as members of the group.

At step 108, the CE updates the table 40 with the member identifiers and transform identifiers for each member in the recently joined group, and proceeds to step 110, where periodic updates from the GCKS, indicating the addition and deletion of members, and updating of transform identifiers cause the table 40 of the CE to be updated.

Figure 4:
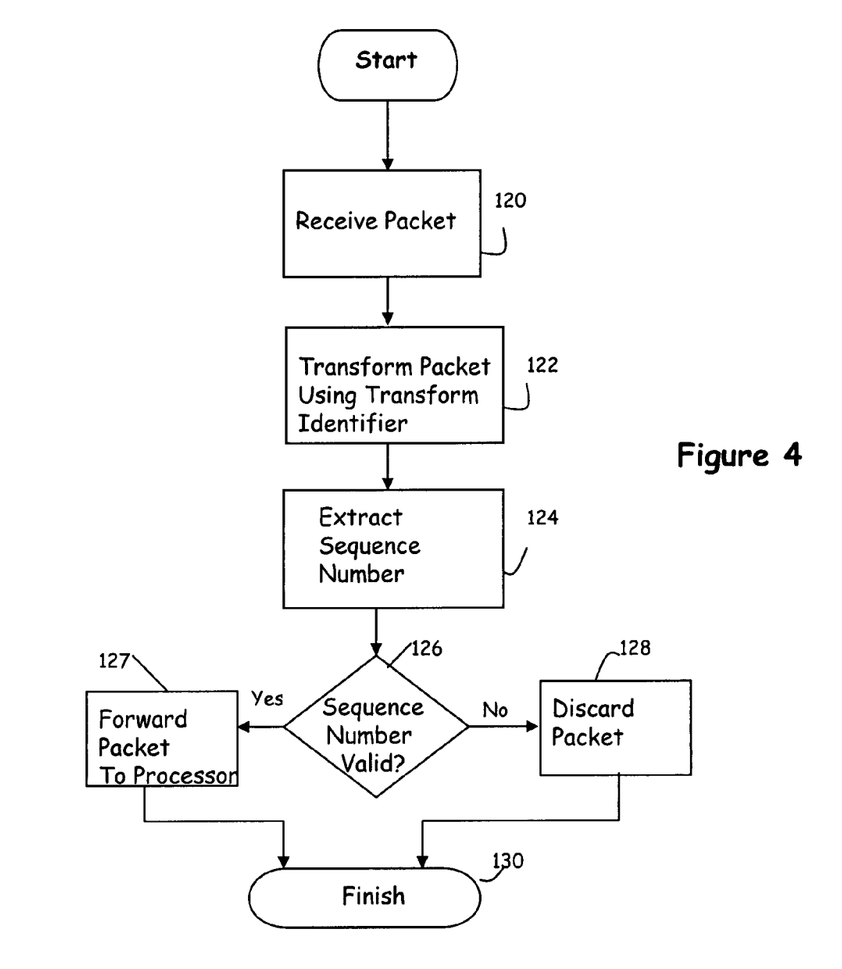
FIG. 4 is flow diagram illustrating the use of transform identifiers for associating received packets with transmitting members of a group for the purposes of distinguishing between transmit streams of the group members.

Upon completion of the processes of FIG. 3, each CE can now use the transform identifiers to distinguish between transmitting group members, thereby enabling the CE to track sequence numbers associated with transmission streams from each of the members of the group. Referring now to FIG. 4, at step 120, when a packet is received at the CE it is transformed at step 122 using the transform identifier stored in table 40 (FIG. 2). The sequence number is extracted from the security protocol header at step 124. At step 126, the anti-replay mechanism 44 determines whether the extracted sequence number correlates with the expected sequence number and is therefore 'valid'. If not, at step 128 the packet is discarded. Otherwise, at step 127 the packet is forwarded onward for further processing.

Accordingly a method and apparatus has been shown and described which enables anti-replay mechanisms to be used in systems which utilize group key security associations for securing data between members of a group. The above description and Figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof. For example the tables of FIGS. 1 and 2 may be implemented as hardware storage devices or may represent data elements stored in a data structure.

FIGS. 3 and 4 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

The invention claimed is:
1. A method comprising:
processing packets received at an edge device in a network, where the edge device is a member of a group of devices using a group security association such that packets sent by members of the group of devices utilize uncorrelated sequence numbers that are not unique within the group, by:
receiving a unique transform identifier for each member of the group;
receiving both a first packet from a first one of the members of the group and a second packet from a second one of the members of the group within a predefined window, the first packet and the second packet utilizing identical sequence numbers;
decoding the first packet;
using the unique transform identifier associated with the first one of the members to associate the first packet with the first one of the members of the group;
extracting the sequence number from the first packet;
comparing the extracted sequence number against an expected sequence number for the first one of the members associated with the packet
decoding the second packet;

using the unique transform identifier associated with the second one of the members to associate the second packet with the second one of the members of the group;

extracting the sequence number from the second packet; and comparing the extracted sequence number against an expected sequence number for the second one of the members associated with the packet; and determining that the sequence number of the first packet and the sequence number of the second packet are both valid.

2. The method of claim 1, wherein the transform identifier is a security association used to transform communications transmitted by an associated group member.

3. The method of claim 1, wherein the transform identifier for each member is a Security Parameter Index (SPI) of the associated member.

4. A network device comprising:

a first table for storing a plurality of transform identifiers, each one of the plurality of transform identifiers uniquely associated with a different one of a plurality of members of a group of which the network device is also a member;

a second table for storing a sequence number for each one of the plurality of members of the group; and logic which processes communications received from another device which is a member of a group of devices including the network device that use a group security association such that communications sent by members of the group of devices utilize uncorrelated sequence numbers that are not unique within the group by:

receiving both a first communication from a first one of the members of the group and a second communication from a second one of the members of the group within a predefined window, the first communication and the second communication utilizing identical sequence numbers;

transforming the first communication received from the first one of the members of the group using the corresponding transform identifier in the first table and extracting a sequence number from the first communication;

transforming the second communication received from the second one of the members of the group using the corresponding transform identifier in the first table and extracting a sequence number from the second communication; and determining whether the extracted sequence numbers correlate to expected sequence numbers as indicated in the second table by using the transform identifiers associated with the first and second ones of the members to associate the first and second communications with the first and second ones of the members.

5. The network device of claim 4, further including means for discarding the communication if it is determined that the extracted sequence number does not correlate with the expected sequence number.

6. The network device of claim 4, wherein the transform identifier is a security association used to transform communications transmitted by an associated group member.

7. The network device of claim 4, wherein the transform identifier for each member is a Security Parameter Index (SPI) of the associated member.

8. A network device comprising:

logic which processes packets received from another device which is a member of a group of devices including the network device that use a group security association such that packets sent by members of the group of devices utilize uncorrelated sequence numbers that are not unique within the group, including:

means for receiving both a first packet from a first one of the members of the group and a second packet from a second one of the members of the group within a predefined window, the first packet and the second packet utilizing identical sequence numbers;

means for storing, for each group in which the device is a member, a unique transform identifier for each member of each group and an expected sequence number for each member of each group;

means for decoding the first and second packets;

means for using the unique transform identifiers associated with the first and second members to associate the first and second packets with the first and second members of the group;

means for extracting the sequence numbers from the first and second packets; and means for comparing the extracted sequence numbers against expected sequence numbers for the first and second members associated with the first and second packets; and means for determining that the sequence number of the first packet and the sequence number of the second packet are both valid.

9. The network device of claim 8, wherein the expected sequence number is different for each transmitting member of the group.

10. The network device of claim 8, wherein the expected sequence number is different for each receiving member.

11. A network comprising:

a device which processes packets received from another device which is a member of a group of devices including the network device that use a group security association such that packets sent by members of the group of devices utilize uncorrelated sequence numbers that are not unique within the group, including:

a registration table for storing registration information associated with each member, the registration information including a different transform identifier for each member of the group, the transform identifier for use by the corresponding member of the group for transforming communications issued by the corresponding member and distinguishing between transmissions by different members of the group by:

receiving both a first packet from a first one of the members of the group and a second packet from a second one of the members of the group within a predefined window, the first packet and the second packet utilizing identical sequence numbers;

using the unique transform identifiers associated with the first and second members to associate the first and second packets with the first and second members of the group;

extracting the sequence numbers from the first and second packets;

comparing the extracted sequence numbers against expected sequence numbers for the first and second members associated with the first and second packets; and determining that the sequence number of the first packet and the sequence number of the second packet are both valid.

12. The network of claim 11, wherein the transform identifier is a security association used to transform communications transmitted by an associated group member.

13. The network of claim 11, wherein the transform identifier for each member is a Security Parameter Index (SPI) of the associated member.

14. The network of claim 11, the device further includes means for forwarding the different transform identifier information to each member of each group.

15. A method for detecting replayed packets in a network comprising:
registering each member of a group of members at a device in the network, including associating, with each member of the group that use a group security association such that packets sent by members of the group utilize uncorrelated sequence numbers that are not unique within the group, a different transform identifier to be used by the member of the group when transmitting communications to other members of the group;
forwarding transform identifiers for each member of the group to all members of the group;
receiving both a first packet from a first one of the members of the group and a second packet from a second one of the members of the group within a predefined window, the first packet and the second packet utilizing identical sequence numbers;
using the unique transform identifiers associated with the first and second members to associate the first and second packets with the first and second members of the group;
extracting the sequence numbers from the first and second packets;
comparing the extracted sequence numbers against expected sequence numbers for the first and second members associated with the first and second packets; and
determining that the sequence number of the first packet and the sequence number of the second packet are both valid.

16. The method of claim 15, wherein the transform identifier is a security association used to transform communications transmitted by an associated group member.

17. The method of claim 15, wherein the transform identifier for each member is a Security Parameter Index (SPI) of the associated member.

18. The method of claim 15 further including the step of periodically updating the transform identifiers for each member of each group.

19. A network comprising:
means for registering each member of a group of members that use a group security association such that packets sent by members of the group utilize uncorrelated sequence numbers that are not unique within the group at a device in the network, including means for associating each member of the group with a different transform identifier to be used by the member of the group when transmitting communications to other members of the group;
means for forwarding transform identifiers for each member of the group to all members of the group;
means for receiving both a first packet from a first one of the members of the group and a second packet from a second one of the members of the group within a predefined window, the first packet and the second packet utilizing identical sequence numbers;
means for using the unique transform identifiers associated with the first and second members to associate the first and second packets with the first and second members of the group;
means for extracting the sequence numbers from the first and second packets;
means for comparing the extracted sequence numbers against expected sequence numbers for the first and second members associated with the first and second packets; and
means for determining that the sequence number of the first packet and the sequence number of the second packet are both valid.

20. The network of claim 19, wherein the transform identifier is a security association used to transform communications transmitted by an associated group member.

21. The network of claim 19, wherein the transform identifier for each member is a Security Parameter Index (SPI) of the associated member.

22. The network of claim 19 further including means for periodically updating the transform identifiers for each member of each group.

* * * * *